March 24, 1953 — T. S. PERRIN — 2,632,688
PRODUCTION OF CHROMIUM TRIOXIDE
Filed Feb. 15, 1952
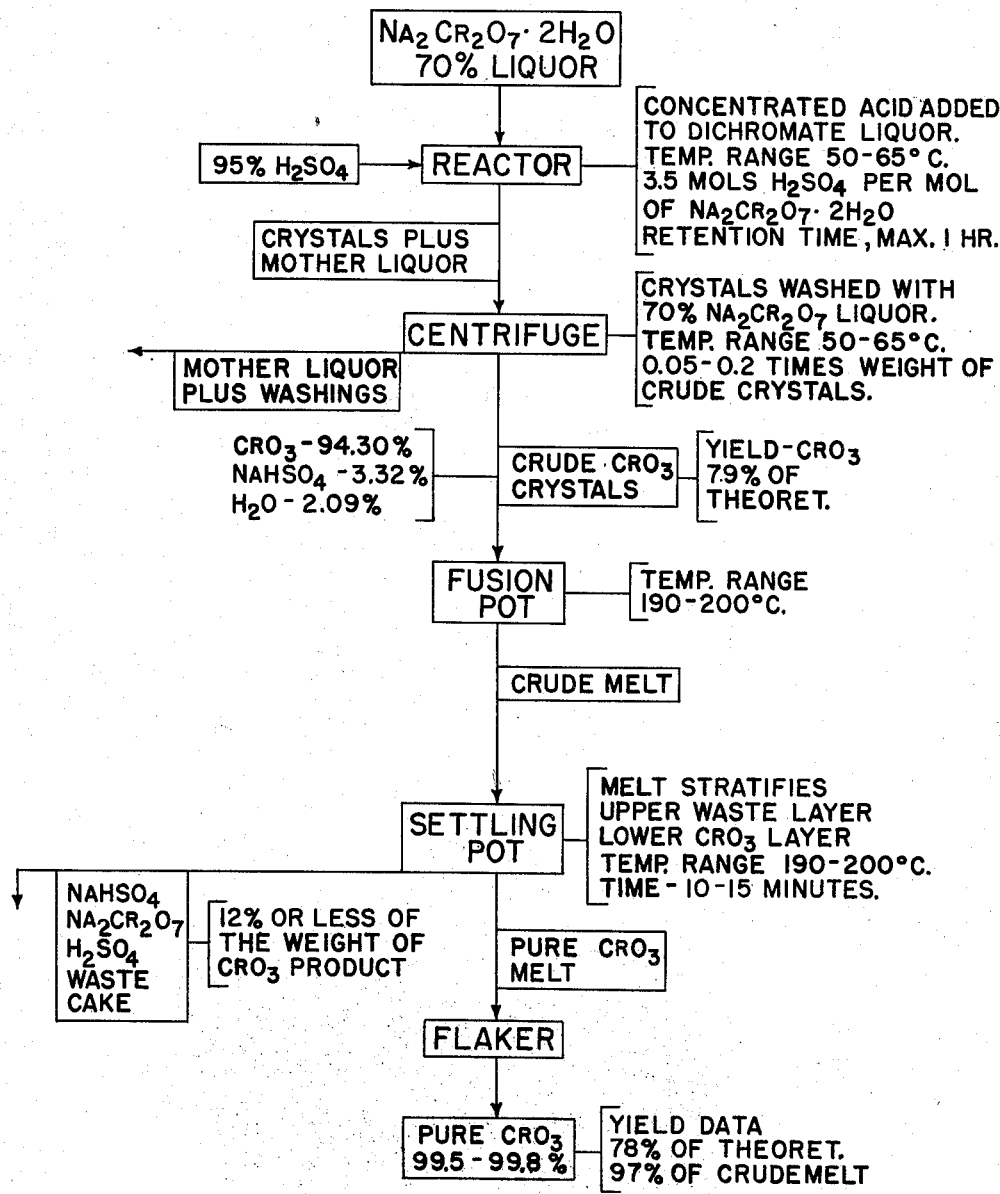
INVENTOR.
TOM S. PERRIN Patented Mar. 24, 1953

2,632,688

UNITED STATES PATENT OFFICE 2,632,688

PRODUCTION OF CHROMIUM TRIOXIDE

Tom S. Perrin, Painesville, Ohio, assignor to Diamond Alkali Company, Cleveland, Ohio, a corporation of Delaware Application February 15, 1952, Serial No. 271,774

6 Claims. (Cl. 23—145)

This invention relates to improvements in the manufacture of solid chromic anhydride, and more particularly relates to improvements in the manufacture of solid chromic anhydride from a solution of an alkali metal dichromate.

The methods heretofore proposed for the manufacture of solid chromic anhydride ($CrO_3$) fall rather sharply into two distinct classes. The first of these classes, which is the present commercial method in the United States for the production of chromic anhydride, is sometimes referred to as the "dry" method; in this method, the starting material, sodium or potassium dichromate, is employed in the dry, solid state. The second of the two classes is often referred to as the "wet" method; in this method, the starting raw material, again sodium or potassium dichromate, is in aqueous solution.

In the "dry" method, the sodium or potassium dichromate crystals are placed in a suitable reactor; concentrated sulfuric acid in the form of 20% oleum (104.5% $H_2SO_4$) is added to the crystals in the reactor to cause decomposition of the dichromate to chromic anhydride, the temperature of the reactants being maintained throughout the reaction at a sufficiently high point to insure complete fluidity of the reaction mass during the reaction period. The sodium dichromate is converted to chromic anhydride and sodium acid sulfate in the reactor, the chromic anhydride settling to the bottom of the reactor as a viscous, red liquid and the sodium acid sulfate dross rising to the top of the liquid mass. After sufficient time has elapsed for substantially complete stratification of the two layers, the molten chromic anhydride is withdrawn from the bottom of the reactor.

The principal objections to the dry method for the manufacture of chromic anhydride are the necessity of using 20% oleum in the reactor at relatively high temperatures, i. e., 200° C., the very large amount of waste material which must be disposed of, normally in the ratio of 150–160 parts by weight of dross material to 100 parts by weight of chromic anhydride produced, as well as the use of a crystalline dichromate as the starting material, which renders the process hazardous to the health of plant personnel.

In the wet method for the production of chromic anhydride from sodium or potassium dichromate, from 1 to 2½ parts by weight of concentrated sulfuric acid are added to 1 part by weight of a saturated solution of the dichromate salt, to form an aqueous slurry of the chromic anhydride crystals in sulfuric acid solution.

The crystals of chromic anhydride are separated from the sulfuric acid solution, as by filtration, and re-crystallized from sulfuric acid solution by forming a saturated chromic acid solution with the crude chromic anhydride crystals, adding strong sulfuric acid thereto, and evaporating the solution to incipient crystallization of the chromic anhydride, cooling the solution to insure a relatively high yield of the chromic anhydride, filtering, washing with relatively strong nitric acid, and heating the crystal mass to evaporate the sulfuric acid and nitric acid adhering to the crystals.

It has apparently been the numerous and involved steps after crystallization of the chromic anhydride, i. e., the re-crystallization of the chromic anhydride from a relatively strong sulfuric acid solution, as well as the final preparation of the crystals for packaging, which have been the principal deterrent to the use of the "wet" method for the production of chromic anhydride on a commercial scale.

One of the objects of the present invention is to provide certain modifications and improvements in the "wet" process for the production of chromic anhydride, whereby the "wet" process becomes commercially feasible.

Another object of the invention is to provide an improved "wet" method for the production of chromic anhydride, wherein purification of the crude product by crystallization from aqueous solution is eliminated.

These and other objects will appear from the description of the invention hereinbelow.

It has now been found that the crude mass of chromic anhydride crystals may be subjected to fusion and the fused mass stratified if the crystals are properly treated prior to fusing the same, whereby pure chromic anhydride is produced by a method which enjoys substantially all of the advantages of each of the prior art methods without the attendant disadvantages of either. Thus, it has been found in the production of chromic anhydride from a saturated solution of an alkali metal dichromate, by the addition to said solution of concentrated sulfuric acid, with the attendant formation of a solid phase of chromic anhydride crystals, that if most of the mother liquor is separated from the crude chromic anhydride crystals, and the crude crystals washed with a saturated aqueous solution of the alkali metal dichromate compound from which the crystals were formed, there results a readily fusible mass of crude crystals having a very low proportion of dross, and yielding a dross which has a freezing point lower than, or nearly the same as, the freezing point of the chromic anhydride, whereby the fusion mass is readily maintained in fluid condition at a temperature only slightly above the fusion temperature of the chromic anhydride, and substantially complete stratification of the fused chromic anhydride and the dross layer is accomplished in a relatively short time.

Thus, in the recovery of chromic anhydride from a concentrated aqueous solution of an alkali metal dichromate, which includes adding concentrated sulfuric acid to said solution to precipitate chromic anhydride, separating the precipitate of chromic anhydride with adhering mother liquor as a mass of crude chromic anhydride crystals, and recovering substantially pure chromic anhydride from the mass of crude crystals, the present invention is directed to the improvement which includes washing the mass of crude crystals with a saturated aqueous solution of said alkali metal dichromate, heating the washed crystal mass to the fusion point thereof, allowing the fused mass to stratify in the molten condition to form a lower layer of substantially pure chromic anhydride and an upper layer of dross, separating said substantially pure chromic anhydride from said dross, and separately recovering said chromic anhydride and said dross.

Further improvements arise in conjunction with the above steps, in maintaining the temperature of the dichromate solution during the addition of the sulfuric acid thereto and during the formation of the chromic anhydride crystals, substantially within the range of 50°–65° C., and in maintaining the temperature of the mass of precipitated crude chromic anhydride crystals and the wash solution of the alkali metal dichromate, also substantially within the range of 50°–65° C., during the washing of said mass of crude crystals with said saturated solution.

Moreover, in washing the crude crystals, it is preferable to control the amount of wash alkali metal dichromate solution to an amount within the range of 0.05–0.2 times the weight of the crude crystal mass. Although quantities of wash solution outside this range may be used where conditions permit, the quantities within the range insure adequate removal of sulfuric acid and sodium bisulfate from the crystal mass to prevent the formation of a relatively large volume of dross during the fusion step and, more important, supplies a sufficient amount of alkali metal dichromate to the remaining acid and bisulfate adhering to the crystals to insure the formation of a eutectic mixture in the dross material, which eutectic mixture has a melting point substantially below that of the fusion point of the chromic anhydride crystals.

Referring now to the drawing attached hereto and forming a part hereof, there is presented a chemical process flow-sheet illustrating the principles of the present invention for the manufacture of chromic anhydride. It will, of course, be appreciated by those skilled in the art that while the drawing sets forth the principles of the present invention in terms of employing saturated (70%) sodium dichromate solution as a starting material, the principles of the present invention are equally applicable to the dichromates of the other alkali metals, lithium, potassium, rubidium, and cesium.

In the drawing, it will be noted that a saturated solution of sodium dichromate (70%) is combined with sulfuric acid in a suitable reactor. The concentration of the sulfuric acid may vary between 78% $H_2SO_4$ and 20% oleum (104.5% $H_2SO_4$), preferably about 95% $H_2SO_4$, in order to obtain optimum correlation of yield of chromic anhydride, amount of dross produced, and amount of reduced chromium in the mother liquor. The addition of the concentrated acid to the saturated sodium dichromate liquor is so controlled as to maintain the temperature in the reactor substantially within the range of 50°–65° C., and the amount of acid employed falls substantially within the range of 3–4 mols of $H_2SO_4$ per mol of sodium dichromate dihydrate, preferably about 3.5 mols of $H_2SO_4$ per mol of dichromate. Substantially less than 3 mols of acid per mol of dichromate adversely affects the yield of chromic anhydride, and substantially more than 4 mols of acid per mol of dichromate unnecessarily increases the amount of dross.

In order to insure maximum yield of the chromic anhydride crystals, it is preferable to retain the reaction mixture within the reactor for at least ¼ hour to insure substantially complete separation of the chromic anhydride available from the sodium dichromate, and not longer than about 1 hour to prevent undue decomposition of the chromic anhydride formed in the reactor. The slurry of chromic anhydride crystals in the solution of sulfuric acid containing some sodium dichromate is then passed to a suitable means for the separation of the chromic anhydride crystals from most of the mother liquor, for example, a centrifuge, and thereafter, the crystals are washed with a saturated solution of the alkali metal dichromate material employed as a saturated solution at the start of the process, in this case, a saturated solution (70%) of sodium dichromate. As noted above, the temperature of the crystal mass, as well as the saturated solution of sodium dichromate liquor, is advantageously maintained within the range of 50°–65° C. in order to insure maximum solution of sodium acid sulfate in the saturated sodium dichromate solution at the lower end of the range, and to prevent reduction of the hexavalent chromium caused by heating the mother liquor to temperatures substantially above the upper part of the range. Also as noted above, the amount of wash sodium dichromate solution is advantageously maintained within the range of 0.05–0.2 times the weight of the crude crystal mass passed to the centrifuge.

After being washed with the saturated sodium dichromate solution, the crystals are placed in a fusion pot and heated to the fusion temperature. Here, the temperature of the fusion mass is carefully controlled so as to be within the range of 190°–200° C. in order to insure complete fusion of the chromic anhydride and in order to insure against substantial decomposition. Also, as pointed out above, because of the substantially lower freezing point of the eutectic mixture in the dross layer, the fluidity of the dross layer is assured within this temperature range.

Next, the fused mass of crude crystals comprising the chromic anhydride and the dross layer is allowed to stratify, either in the fusion pot or in a separate piece of apparatus, for example, as shown, a settling pot, again maintaining the temperature of the fused mass within the range of 190°–200° C., the retention time in the settling pot or its equivalent being not substantially longer than about 30 minutes, preferably about 10–15 minutes, in order to prevent substantial decomposition of the chromic anhydride. In the settling pot or its equivalent, the substantially pure chromic anhydride melt is withdrawn as the bottom layer of the two strata and passed to a flaker or other suitable means for freezing the molten chromic anhydride. The dross layer containing sodium acid sulfate, sodium dichromate, and sulfuric acid is then removed from the settling pot as the upper of the two strata and, as will be noted from the drawing, ordinarily amounts to about 12% of the weight of the chromic anhydride product produced.

This is, of course, in marked contrast to the 150%–160% of dross obtained by the "dry" method based upon the weight of chromic anhydride produced. Further, the small amount of dross material, relative to the chromic anhydride produced, permits rapid stratification of the fusion mass, whereby substantially less reduced chromium compounds are formed than are formed in the "dry" method, and whereby residence time in the settling pot or its equivalent is considerably lessened. The above series of steps comprising the present invention is also in marked contrast to the prior art "wet" processes involving re-crystallization, washing, and further re-crystallizations of the chromic anhydride prior to obtaining the same in a degree of purity even comparable with the process of the present invention.

In order that those skilled in the art may better understand the method of the present invention and in what manner the same may be carried into effect, as well as providing basis for the preferred conditions hereinabove set forth, the following specific examples are offered:

Example I

Into a glass-lined reactor, there are introduced 3810 parts of a saturated solution of sodium dichromate dihydrate (70% liquor), and to this solution there are added 3½ mols of sulfuric acid, in the form of an aqueous 95% $H_2SO_4$ solution, for each mol of sodium dichromate dihydrate in the liquor. During the addition of the sulfuric acid to the liquor, the temperature is so controlled as to fall substantially within the range of 55°–65° C., and the reaction mixture agitated thoroughly during the addition of the acid. After the addition of the sulfuric acid to the dichromate solution is completed, the reaction mixture is agitated for a few minutes and the slurry of chromic anhydride crystals in the sulfuric acid-dichromate solution is then passed to a centrifuge for the separation of most of the mother liquor from the crystals. On the centrifuge, the crude crystals are washed with 225 parts of a saturated solution of sodium dichromate dihydrate and the crystals removed from the centrifuge basket and transferred to a fusion pot, in which the crude crystals are heated to a temperature substantially within the range of 190°–200° C. The crude crystals of chromic anhydride are added to the fusion pot in relatively small portions to insure complete fusion of the entire mass and to avoid the formation of lumps which fuse only with difficulty. After substantially all of the mass of crude crystals has been added and the molten mass found to be free of unfused lumps, the fused mass is transferred to a settling pot wherein it is allowed to stratify for 10 minutes, during which time there is formed an upper dross layer and a lower molten chromic anhydride layer. The molten chromic anhydride layer is first withdrawn from the settling pot, cooled and solidified, after which the molten dross layer is withdrawn from the pot, cooled and solidified.

A second portion of 3810 parts of a saturated solution of sodium dichromate dihydrate (70% liquor) is treated in precisely the same manner as set forth above, except that there is no washing of the crude chromic anhydride crystals. Data obtained in each run are given in the table below for comparison purposes:

|  | (1) | (2) |
|---|---|---|
| Yield, basis of $Na_2Cr_2O_7 \cdot 2H_2O$ _____ percent__ | 79 | 78 |
| Percent $CrO_3$ in $CrO_3$ product_____ | 99.4 | 98.3 |
| Dross, parts per 100 parts of $CrO_3$ produced_____ | 15.4 | 25.4 |
| Percent insoluble material in dross_____ | 22.9 | 59.4 |
| Soluble $Cr^{+++}$ compounds in mother liquor; percent of $CrO_3$ produced_____ | 0.018 | 0.013 |
| Remarks_____ | (1) | (2) |

[1] Dross layer fluid @ 190°–200° C.
[2] Dross layer solid @ 190°–200° C.

Example II

The procedure of Example I is repeated with the same amounts of sodium dichromate dihydrate liquor in 2 separate portions, the first of which is reacted with 3.5 mols of $H_2SO_4$ in the form of a 95% $H_2SO_4$ solution, and the second of which is reacted with 4 mols of $H_2SO_4$ in the form of a 95% $H_2SO_4$ solution. Also, washing of the crude chromic anhydride crystal mass is effected on the centrifuge with 150 parts of a saturated sodium dichromate dihydrate solution, instead of the 225 parts employed in Example I above. The temperature of the reaction mass during the formation of the chromic anhydride crystals in the sodium dichromate dihydrate liquor and the temperature of fusion of the mass of crude chromic anhydride crystals are the same as in Example I above. The data obtained from analysis of the material produced in each step is given in the table below:

|  | (1) | (2) |
|---|---|---|
| Yield, basis of $Na_2Cr_2O_7 \cdot 2H_2O$ _____ percent__ | 79.7 | 80.2 |
| Percent $CrO_3$ in $CrO_3$ product_____ | 99.9 | 99.3 |
| Dross, parts per 100 parts of $CrO_3$ produced_____ | 18.2 | 38.5 |
| Percent insoluble material in dross_____ | 34.3 | 33.8 |
| Soluble $Cr^{+++}$ compounds in mother liquor; percent of $CrO_3$ produced_____ | 0.013 | 0.013 |
| Remarks_____ | (1) | (1) |

[1] Dross layer fluid @ 190°–200° C.

Example III

Following the procedure described in Example I above, 3810 parts of a saturated solution of sodium dichromate dihydrate is treated with sulfuric acid in the form of 20% oleum (104.5% $H_2SO_4$) in the amount of 3 mols of $H_2SO_4$ per mol of sodium dichromate dihydrate in the dichromate liquor, and the crude chromic anhydride crystals obtained by the acid treatment are washed with 150 parts of a saturated solution of sodium dichromate dihydrate on the centrifuge. The temperature of the reaction mass is maintained substantially within the range of 50°–65° C. during the addition of the oleum to the sodium dichromate liquor, and the fusion temperature for the washed crystals obtained from the centrifuge is substantially within the range of 190°–200° C. The data obtained are given in the table below:

Yield, basis of $Na_2Cr_2O_7 \cdot 2H_2O$ ___per cent__ 74
Per cent $CrO_3$ in $CrO_3$ product_____ 99.0
Dross, parts per 100 parts of $CrO_3$ produced _____ 18.7
Per cent insoluble material in dross_____ 19.1
Soluble $Cr^{+++}$ compounds in mother liquor; per cent of $CrO_3$ produced_____ 0.054
Remarks_____ Dross layer fluid @ 190°–200° C.

Example IV 3810 parts by weight of a saturated solution of sodium dichromate dihydrate are treated with a 95% solution of $H_2SO_4$ in the amount of 3.5 mols of $H_2SO_4$ per mol of sodium dichromate dihydrate in the saturated solution. The temperature of the sodium dichromate dihydrate and the reaction products formed are maintained substantially constant at 90° C. during the addition of the sulfuric acid, the crude crystals of chromic anhydride produced are washed on the centrifuge with 225 parts by weight of the saturated solution of sodium dichromate dihydrate, and the washed crystals fused at a temperature substantially within the range of 190°–200° C., all as set forth in Example I above. Data obtained are set forth in the table below:

| | |
|---|---|
| Yield, basis of $Na_2Cr_2O_7 \cdot 2H_2O$ ___per cent__ | 78.9 |
| Per cent $CrO_3$ in $CrO_3$ product_____ | 97.8 |
| Dross, parts per 100 parts of $CrO_3$ produced _____ | 9.6 |
| Per cent insoluble material in dross_____ | 21.2 |
| Soluble $Cr^{+++}$ compounds in mother liquor; per cent of $CrO_3$ produced_____ | 0.080 |
| Remarks_____ Dross layer fluid @ 190°–200° C. | |

It will be appreciated by those skilled in the art that the dichromate and sulfuric acid-containing side stream of a process comprising the present invention is not waste material in the sense that it is of no further value or that it is a debit to the process. Both the acid values and the dichromate values are particularly useful in the neutralization of strongly alkaline alkali metal chromate-containing liquors in the conventional alkali roast process for the production of alkali metal dichromates from chromite ores. Moreover, this side stream may be employed in other chemical processes requiring strongly acid dichromate-containing solutions, such, for example, as the oxidation of organic materials to produce organic acids with the attendant reduction chemically of the chromium values to a state suitable for use as a "chrome" tanning agent.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the recovery of chromic anhydride from a concentrated aqueous solution of an alkali metal dichromate by adding concentrated sulfuric acid to said solution to precipitate chromic anhydride, separating the precipitate of chromic anhydride with adhering mother liquor as a mass of crude chromic anhydride crystals, and recovering substantially pure chromic anhydride from said mass of crude crystals, the improvement which includes washing said mass of crude crystals with a saturated aqueous solution of said alkali metal dichromate, heating said washed crystal mass to the fusion point thereof, allowing the fused mass to stratify in the molten condition to form a lower layer of substantially pure chromic anhydride and an upper layer of dross, separating said substantially pure chromic anhydride from said dross, and separately recovering said chromic anhydride and said dross.

2. The method of claim 1 in which the alkali metal dichromate is sodium dichromate, the temperature of the mixture of said concentrated sulfuric acid and said dichromate solution is maintained substantially within the range of 50°–65° C. during the formation of said precipitate of chromic anhydride, and the temperature of said mass of crude chromic anhydride crystals is maintained substantially within the range of 50°–65° C. during the washing of said mass of crude chromic anhydride crystals with said saturated solution of sodium dichromate.

3. The method of claim 2 in which the amount of concentrated sulfuric acid is substantially within the range of 3–4 mols of $H_2SO_4$ per mol of sodium dichromate in said concentrated aqueous solution, and the concentration of $H_2SO_4$ in said concentrated acid falls substantially within the range of 78%–104.5% $H_2SO_4$.

4. The method of claim 2 in which the amount of said saturated solution of sodium dichromate used to wash said crude crystal mass of chromic anhydride is in an amount substantially within the range of 0.05–0.2 times the weight of said mass of crude crystals, and in which the washed mass of crude crystals is heated to a temperature substantially within the range of 190°–200° C. during said fusion and stratification of said fused mass.

5. The method of claim 4 in which the temperature of the mixture of said concentrated sulfuric acid and said dichromate solution is maintained substantially within the range of 50°–65° C. during the formation of said precipitate of chromic anhydride, and the temperature of said mass of crude chromic anhydride crystals is maintained substantially within the range of 50°–65° C. during the washing of said mass of crude chromic anhydride crystals with said saturated solution of sodium dichromate.

6. The method of claim 4 in which the amount of concentrated sulfuric acid is substantially within the range of 3–4 mols of $H_2SO_4$ per mol of sodium dichromate in said concentrated aqueous solution, and the concentration of $H_2SO_4$ in said concentrated acid falls substantially within the range of 95%–104.5% $H_2SO_4$.

TOM S. PERRIN.

REFERENCES CITED

The following references are of record in the file of this patent:

UNITED STATES PATENTS

| Number | Name | Date |
|---|---|---|
| 1,857,548 | Humphries | May 10, 1932 |
| 1,872,588 | Hines | Aug. 16, 1932 |
| 1,873,889 | Hines | Aug. 23, 1932 |
| 2,335,365 | Smith | Nov. 30, 1943 |